Jan. 21, 1941.　　　　M. F. BATES　　　　2,229,033
REMOTE READING GYROMAGNETIC COMPASS
Filed Dec. 17, 1938　　　2 Sheets-Sheet 1
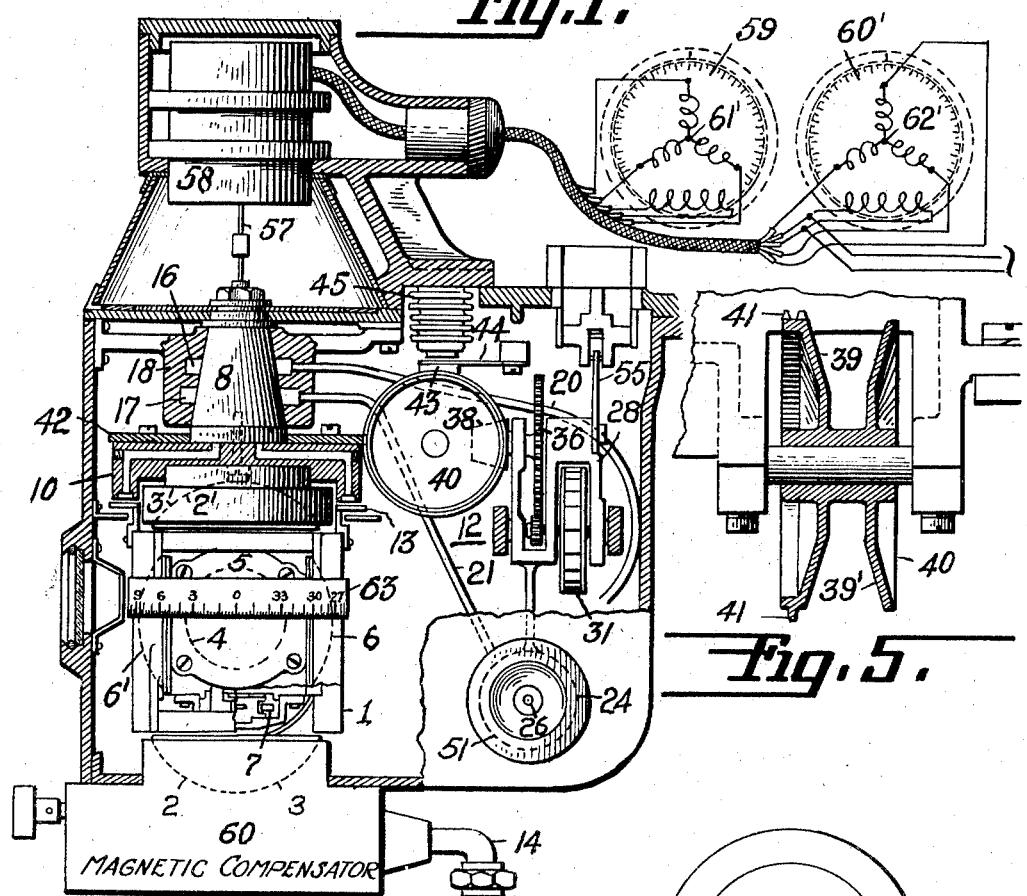
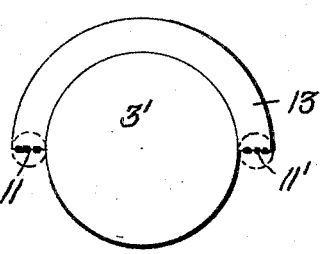
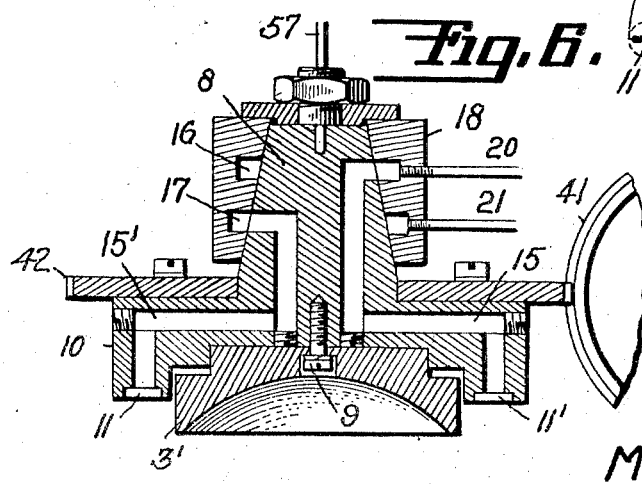
INVENTOR
MORTIMER F. BATES
BY Herbert H. Thompson
his ATTORNEY

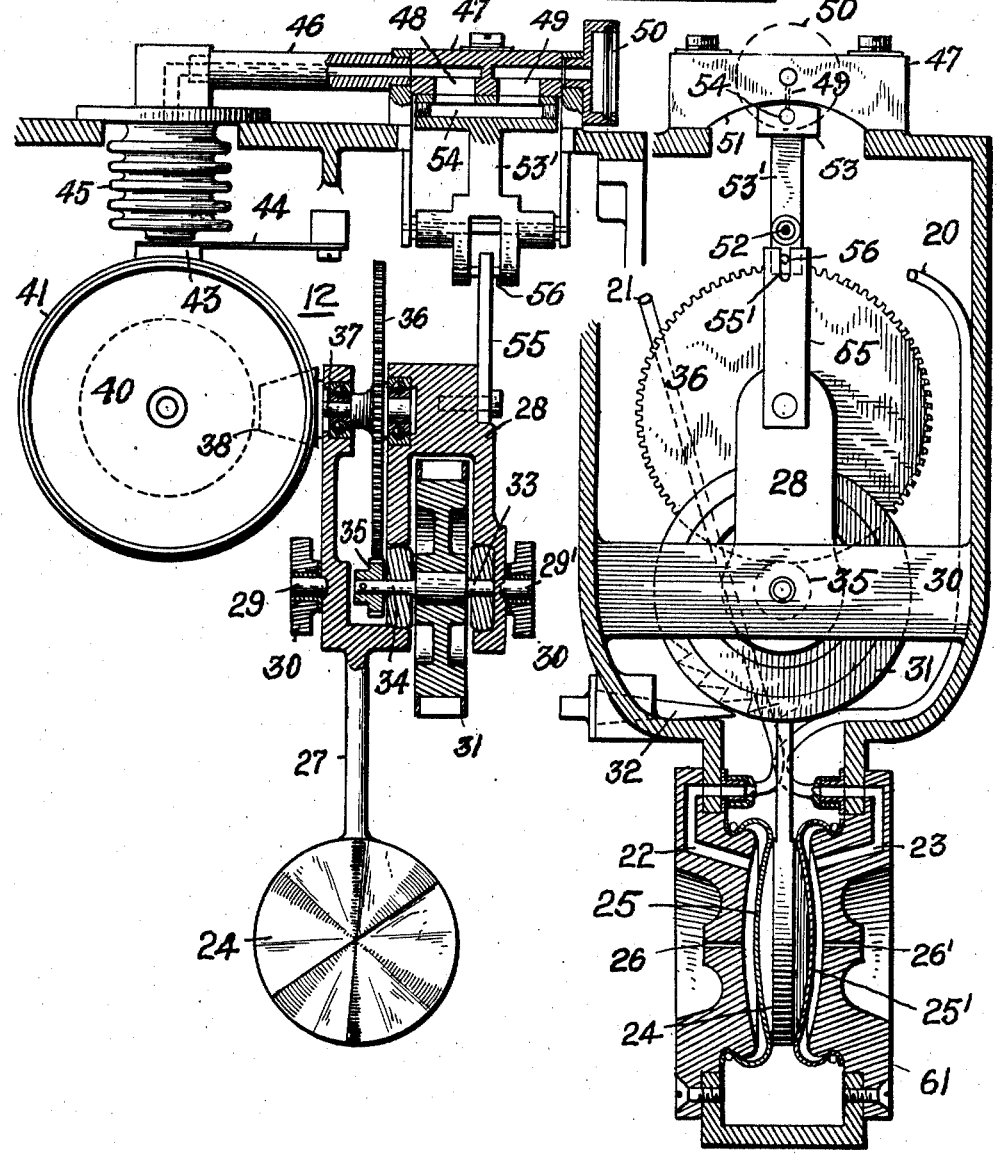

Patented Jan. 21, 1941

2,229,033

UNITED STATES PATENT OFFICE 2,229,033

REMOTE READING GYROMAGNETIC COMPASS

Mortimer F. Bates, Brooklyn, N. Y., assignor to Sperry Gyroscope Company, Inc., Brooklyn, N. Y., a corporation of New York Application December 17, 1938, Serial No. 246,256

5 Claims. (Cl. 33—204)

This invention relates to the art of transmitting to a distance the readings or position of a sensitive instrument, such as a directional gyroscope or gyromagnetic compass. The invention has especial application to the last named instrument, since it is desirable to locate the gyromagnetic compass at a point on the ship or airplane least subject to disturbances of the magnetic element, while it is desirable to have the readings of the compass visible on the instrument panel.

For the sake of illustration, I have shown my invention as applied to a gyromagnetic compass of the type shown in the patent and copending application of Leslie F. Carter, No. 2,091,964, dated September 7, 1938, and Serial No. 233,757, filed October 7, 1938, respectively.

Another object of the invention is to provide a follow-up system for an instrument of this type which is extremely sensitive and accurate and yet not subject to hunting.

Further objects of the invention will appear from the following description.

Referring to the drawings, showing one form my invention may assume,

Fig. 1 is a vertical section, partly in elevation, of a gyromagnetic unit with follow-up and remote control device.

Fig. 2 is an enlarged detail, partly in section, of a portion of Fig. 1, showing the follow-up servomotor.

Fig. 3 is a sectional view taken at right angles to Fig. 2.

Fig. 4 is a vertical section of the upper portion of the gyromagnetic compass, showing the differential air flow pick-off device.

Fig. 5 is a side elevation, partly in section, of the driven element of the friction drive servomotor.

Fig. 6 is a top view of the cut-off plate forming the portion of the differential air pick-off device which is complementary to the part shown in Fig. 4.

As stated above, my invention is shown as applied to the form of gyromagnetic compass shown in the Carter patent and application, which is of the air borne type having the vertical ring 1 supported in upper and lower spherical air bearings 2 and 2', the stationary portions of which comprise cups 3 and 3'. A cylindrical compass card 63 is shown as surrounding the vertical ring. The rotor 4 is shown in dotted lines within the rotor bearing casing 5, the latter being mounted for oscillation about a horizontal axis in spherical air bearings 6 and 6'. The magnetic element is shown at 7, being rotatably mounted on air bearings in the bottom of the casing 5, and this controls the position of the gyromagnetic compass in azimuth by means such as described in the aforesaid patent and application. The box 60 contains a compensator for the magnetic element.

In order to secure remote control, the upper spherical bearing housing 3' is shown as rotatably mounted, being secured to a conical shaped stem 8 as by means of set screw 9. Also rotatable with said bearing 3' is the channel member 10 which carries the slotted ports 11 and 11' forming one portion of the differential air flow pick-off device by which I control the follow-up servomotor 12. Air is preferred to electricity in order to keep all D. C. electrical circuits as far away from the magnet 7 as possible. The slots 11 are generally made radial and comparatively narrow, so that a large difference in the air flow is produced by small relative rotation of the semicircular cut-off plate 13 carried by the vertical ring 1 of the gyroscope. Slots 11, 11' and the edges of plate 13 form the pick-off or controller for the follow-up system I employ to actuate the transmitter 58 of the remote control system.

The air pressure employed to operate the gyromagnetic compass may be either above or below that of the atmosphere, that is, either positive or negative, the latter being shown herein. In this case, air is continuously exhausted from the gyro case through pipe 14 and a connected pump (not shown) and enters the case through several openings for spinning the rotor, providing air flow for the bearings, and for operating the follow-up system. Separate channels 15 and 15' are provided to supply the ports 11 and 11' for the last named purpose. These channels extend upwardly through the stem 8 and open into annular channels 16 and 17, respectively, in the stationary bearing housing 18 enclosing the conical stem 8. Connected to said channels are pipes 20 and 21 connected to ports 22 and 23 in a suitable relay device 61, shown as comprising a central movable piston or plate 24, on each side of which is a flexible diaphragm 25, 25', each of which seals in a space adjacent the ports 22, 23. Each space or chamber, however, has a bleed 26, 26' to the atmosphere, so that air is continuously being drawn in through the bleeds, channels and pipes and into the evacuated gyro casing through the ports 11, 11'. As long as the ports are equally covered, the pressure behind the two diaphragms or bellows remains equal and the plate 24 centralized. In case, however, one port is covered more than the other, the pressure rises in the space enclosed by the diaphragm connected to the closed port and the plate 24 is forced toward the other diaphragm to control the operation of the servomotor 31—40.

Said plate 24 is shown as secured to an extension 27 projecting from a bracket 28 pivoted on stub shafts 29, 29' in fixed cross pieces 30, so that when said plate is rocked by the bellows, the bracket is also rocked. Within said bracket is rotatably mounted a turbine wheel or impeller 31 continuously spun by air jet 32 about an axis 33 coaxial with the axis of stub shafts 29, 29'. On the shaft 34 of the turbine I have shown a pinion 35 meshing with a large gear 36 mounted on a shaft 37 journaled in said bracket, which carries at its outer end a friction roller 38. Said roller is normally midway between friction faces 39, 39' of the driven member or clutch 40, so that when the bracket is rocked in one direction or the other, the friction roller is brought onto one or the other of faces 39, 39' to drive the member 40 in one direction or the other. The member 40 acts to turn the follow-up member 10. For this purpose it is shown as having a spiral thread 41 cut in its periphery, which meshes with a spiral gear 42 secured to member 10 and cone 8 so as to cause the same to follow the sensitive element of the gyroscope.

In order to prevent overrunning and hunting of the follow-up system, I provide an automatic braking device which is applied whenever the servomotor is moved to the off position. Said brake is shown as in the form of a brake shoe 43 biased to the "off" position by being mounted on a leaf spring 44. For applying the brake, I have shown an expansible metallic bellows or Sylphon 45 which operates as a cylinder and piston by pressing its lower end against the brake shoe and applying the same whenever the bellows is expanded. The bellows is mounted, as shown, inside the evacuated casing and has its interior connected through a pipe 46 with a ported or valve member 47. Said member has two ports 48 and 49 therein which are normally separated, one of said ports being in direct communication with pipe 46 and the other with the outside air through the screened cap 50. The ported under side 51 of the member 47 is shown as curved about the center 52 of a pivoted cooperating valve member 53. Said member has a narrow channel 54 extending parallel to the pivot pin 52 so that when said valve is central, the ports 48 and 49 are connected to the channel 54, thereby admitting atmospheric air into the interior of Sylphon 45 and expanding the same to apply the brake. When, however, the forked carriage 28 is rocked in either direction by the engagement of the notch 55' in arm 55 secured thereto with the pin 56 on the arm 53' carrying valve 53, the valve 53 is rocked in one direction or the other far enough to move the slot 54 beyond the ports 48 and 49, thereby cutting off most of the air supply from outside. When this is done, the Sylphon 45 will collapse almost immediately owing to the escape of the air therein into the evacuated chamber through the leak between the valve parts 51 and 53, thereby removing the brake to permit the servomotor to turn the gear 42.

Since this gear is power driven, I may couple any suitable form of transmitter directly thereto. For this purpose I have shown a small shaft 57 extending up from the cone member 8 and coupled to the shaft of an electric transmitter 58, which may be of the A. C. self-synchronous type. The transmitter is shown diagrammatically as driving a plurality of repeater compass cards 59 and 60' through self-synchronous repeater motors 61' and 62' in the well known manner.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a gyromagnetic compass, the combination with the rotatably mounted vertical ring member, a rotatably mounted bearing member therefor, a differential air flow pick-off device operable upon relative turning of said members, a continuously driven air motor, means driven by said motor for turning said bearing member, and a reversing clutch controlled by said pick-off device and between said motor and said bearing member and turning said member in either direction depending upon the direction of relative turning of said members.

2. In a remote reading gyroscopic directional device, the combination with the rotatably mounted vertical ring member, a rotatably mounted follow-up member therefor, a differential air flow pick-off device operable upon relative turning of said members, a continuously operated air motor, means driven by said motor for turning said follow-up member, and a reversing clutch controlled by said pick-off device and between said motor and said bearing member and turning said member in either direction depending upon the direction of relative turning of said members.

3. In a gyromagnetic compass, the combination with the rotatably mounted vertical ring member, a rotatably mounted bearing member therefor, a differential air flow pick-off device operable upon relative turning of said members, a continuously operated air motor for turning said bearing member, a reversing clutch controlled by said pick-off device and between said motor and said bearing member and turning said member in either direction depending upon the direction of relative turning of said members, a brake for said clutch and means for automatically applying said brake only when power for the motor is disconnected.

4. In a follow-up system for gyroscopic instruments of the air driven type, the combination with the sensitive and follow-up elements, an air flow pick-off device operable upon relative turning of said elements, an air driven servomotor for driving said follow-up element including a continuously driven impeller or rotor, and a two way friction clutch, a relay controlled by said pick-off device for operating said clutch to disconnect the drive or drive the follow-up element in either direction, and an air pressure operated brake for the driven element of said clutch interposed in the drive from said motor to said follow-up element and controlled by the presence or absence of differential air pressure from said pick-off device for suppressing hunting.

5. In a gyromagnetic compass, the combination with the rotatably mounted vertical ring member, a rotatably mounted bearing member therefor, a differential air flow pick-off device operated by and upon relative turning of said members, a continuously driven servomotor for turning the bearing member including an impeller wheel, a pinion thereon, a gear at one side of said pinion and driven thereby, a friction member driven from said gear, a frame pivoted on the axis of said impeller and pinion and carrying said gear and friction member, oppositely facing friction discs on each side of said friction member to be driven therefrom, expansible means subject to differential changes in air pressure from said pick-off device for turning said frame in one direction or the other to cause said friction member to engage and drive said discs in one direction or the other from said friction member, a driving connection between said discs and said bearing member, a spring brake to prevent hunting, said spring being biased to normally engage said friction members, and pneumatic means responsive to pressure flow from said pick-off device in either direction for releasing said brake.

MORTIMER F. BATES.